US009344484B2

(12) United States Patent
Ferris

(10) Patent No.: US 9,344,484 B2
(45) Date of Patent: May 17, 2016

(54) DETERMINING CONSISTENCIES IN STAGED REPLICATION DATA TO IMPROVE DATA MIGRATION EFFICIENCY IN CLOUD BASED NETWORKS

(75) Inventor: James Michael Ferris, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 504 days.

(21) Appl. No.: 13/117,235

(22) Filed: May 27, 2011

(65) Prior Publication Data

US 2012/0303739 A1  Nov. 29, 2012

(51) Int. Cl.
G06F 15/16 (2006.01)
H04L 29/08 (2006.01)
H04L 29/06 (2006.01)

(52) U.S. Cl.
CPC ............ *H04L 67/06* (2013.01); *H04L 29/06* (2013.01); *H04L 29/08072* (2013.01); *H04L 67/1097* (2013.01)

(58) Field of Classification Search
CPC ............. H04L 29/06; H04L 29/08072; H04L 29/08144
USPC ........... 709/220, 227, 224, 225; 711/118, 154
See application file for complete search history.

(56) References Cited

U.S. PATENT DOCUMENTS

| 8,112,471 B2* | 2/2012 | Wei et al. | 709/202 |
| 2011/0137973 A1* | 6/2011 | Wei et al. | 709/202 |
| 2011/0289366 A1* | 11/2011 | Baptist et al. | 714/54 |
| 2011/0289383 A1* | 11/2011 | Dhuse et al. | 714/763 |
| 2011/0295658 A1* | 12/2011 | Bastos et al. | 705/14.1 |
| 2012/0089781 A1* | 4/2012 | Ranade et al. | 711/118 |
| 2012/0221696 A1* | 8/2012 | Ferris | 709/223 |

OTHER PUBLICATIONS

Jeffrey Darcy, "Systems and Methods for Cloud-Based Directory System Based on Hashed Values of Parent and Child Storage Locations," U.S. Appl. No. 12/893,612, filed Sep. 29, 2010.
Jeffrey Darcy, "Systems and Methods for Searching a Cloud-Based Distributed Storage Resources Using a Set of Expandable Probes", U.S. Appl. No. 12/893,737, filed Sep. 29, 2010.
Jeffrey Darcy, "Systems and Methods for Monitoring Files in Cloud-Based Networks", U.S. Appl. No. 12/893,388, filed Sep. 29, 2010.
Jeffrey Darcy, "Systems and Methods for Dynamically Replicating Data Objects Within a Storage Network", U.S. Appl. No. 12/872,022, filed Aug. 31, 2010.

(Continued)

*Primary Examiner* — Khanh Dinh
(74) *Attorney, Agent, or Firm* — Lowenstein Sandler LLP

(57) ABSTRACT

Embodiments relate to systems and methods for data migration among a plurality of cloud-based storage networks. In aspects, an administrator of a data payload may wish to migrate the data payload from a host cloud network to a target cloud provider to leverage cost, security, redundancy, consolidation, or other advantages. A data distribution service can identify data sets replicated from the data payload and located on the data distribution service or other staging sites. The data distribution service or other logic can examine consistencies and/or differences between the data payload in the host cloud network and the replicated data payloads. Depending on the consistencies and/or differences, the data distribution service can directly transport a replicated data payload from the respective staging site to a target cloud in lieu of migrating the data payload out of the host cloud network to the target cloud.

18 Claims, 6 Drawing Sheets

(56) References Cited

OTHER PUBLICATIONS

James Michael Ferris, "Systems and Methods for Stage Data Migration Between Data Sources and Cloud-Based Storage Network", U.S. Appl. No. 13/037,183, filed Feb. 28, 2011.
James Michael Ferris, "Systems and Methods for De-Populating Cloud Data Storage", U.S. Appl. No. 13/036,977, filed Feb. 28, 2011.
James Michael Ferris, "Systems and Methods for Migrating Data Among Cloud-Based Storage Networks via a Data Distribution Service", U.S. Appl. No. 13/037,215, filed Feb. 28, 2011.
James Michael Ferris, "Systems and Methods for Generating a Selection of Cloud Data Distribution Service from Alternative Providers for Staging Data to Host Clouds", U.S. Appl. No. 13/037,148, filed Feb. 28, 2011.
James Michael Ferris, "Systems and Methods for Establishing Upload Channels to a Cloud Data Distribution Service", U.S. Appl. No. 13/037,230, filed Feb. 28, 2011.
James Michael Ferris, "Methods and Systems to Automatically Extract and Transport Data Associated with Workload Migrations to Cloud Networks", U.S. Appl. No. 13/116,599, filed May 26, 2011.
James Michael Ferris, "Systems and Methods for Cloud Data Deployment Based on Preferential and/or Existing Subscription Relationships", U.S. Appl. No. 13/117,331, filed May 27, 2011.
James Michael Ferris, "Methods and Systems for Data Compliance Management Associated with Cloud Migration Events", U.S. Appl. No. 13/118,123, filed May 27, 2011.
James Michael Ferris, "Systems and Methods for Generating Optimized Host Placement of Data Payload in Cloud-Based Based Storage Network", U.S. Appl. No. 13/118,075, filed May 27, 2011.

* cited by examiner

DETERMINING CONSISTENCIES IN STAGED REPLICATION DATA TO IMPROVE DATA MIGRATION EFFICIENCY IN CLOUD BASED NETWORKS

FIELD

The invention relates generally to systems and methods for data migration among a plurality of cloud-based storage networks, and more particularly, to platforms and techniques for determining consistencies in data in a source cloud network with data that is replicated on one or more cloud data distribution sites, to improve data migration efficiency among cloud based networks.

BACKGROUND

The advent of cloud-based computing architectures has opened new possibilities for the rapid and scalable deployment of virtual Web stores, media outlets, social networking sites, and many other on-line sites or services. In general, a cloud-based architecture deploys a set of hosted resources such as processors, operating systems, software and other components that can be combined together to form virtual machines. A user or customer can request the instantiation of a virtual machine or set of machines from those resources from a central server or cloud management system to perform intended tasks, services, or applications. For example, a user may wish to set up and instantiate a virtual server from the cloud to create a storefront to market products or services on a temporary basis, for instance, to sell tickets to or merchandise for an upcoming sports or musical performance. The user can subscribe to the set of resources needed to build and run the set of instantiated virtual machines on a comparatively short-term basis, such as hours or days, for their intended application.

Typically, when a user utilizes a cloud, the user must track the software applications executed in the cloud and/or processes instantiated in the cloud. For example, the user must track the cloud processes to ensure that the correct cloud processes have been instantiated, that the cloud processes are functioning properly and/or efficiently, that the cloud is providing sufficient resources to the cloud processes, and so forth. Due in part to the user's requirements and overall usage of the cloud, the user may have many applications and/or processes instantiated in a cloud at any given instant, and the user's deployment of virtual machines, software, and other resources can change dynamically over time. In cases, the user may also utilize multiple independent clouds to support the user's cloud deployment. That user may further instantiate and use multiple applications or other software or services inside or across multiple of those cloud boundaries, and those resources may be used or consumed by multiple or differing end-user groups in those different cloud networks.

For various reasons, an administrator or other user may wish to consider transporting or migrating a set of data in cloud-hosted storage of one cloud provider to cloud storage associated with another cloud provider. For example, the other cloud provider may offer more storage, better subscription rates, and/or other benefits. In some cases, the administrator may have a large amount of data already in the cloud-hosted storage. For example, in the case of relatively large-scale arrangements, such as those maintained, merely for instance, by hospitals, government agencies, financial institutions, or other entities, the amount of data that needs to be transported or migrated may be in the range of terabytes, petabytes, or more. In the case of those comparatively large-scale data installations, an attempt to transport or migrate the data to another cloud provider over public Internet connections, such as packet-switched TCP/IP (transfer control protocol/Internet protocol) or FTP (file transfer protocol) connections, the delivery of the data payload could require days or weeks of time.

For many organizations, that type of migration delay may be impractical or impossible. In addition, the relatively narrow-bandwidth connections available over the public Internet may not be secure, and for sensitive data or applications, the use of such connections may also not be a valid or practical option. Moreover, narrow-bandwidth connections into host or target storage clouds may not allow for data management services such as error correction, in-flight encryption, or other security or management options. Further, an administrator or other entity associated with a data payload in a source cloud may migrate a data payload to a target cloud while inadvertently failing to realize that a replicated version of the data payload was already stored on a service associated with the target cloud. As such, the administrator may squander processing and transfer time that could have been saved by instead transferring the replicated version of the data payload to the target cloud.

Therefore, it may be desirable to provide systems and methods for identifying data that is consistent with data in the cloud-hosted storage and is already replicated on cloud data distribution sites. In particular, it may be desirable to provide systems and methods for locating consistent data on sites connected to a target cloud to bypass a full-scale migration of data from a source cloud to a target cloud.

DESCRIPTION

Figure 1:
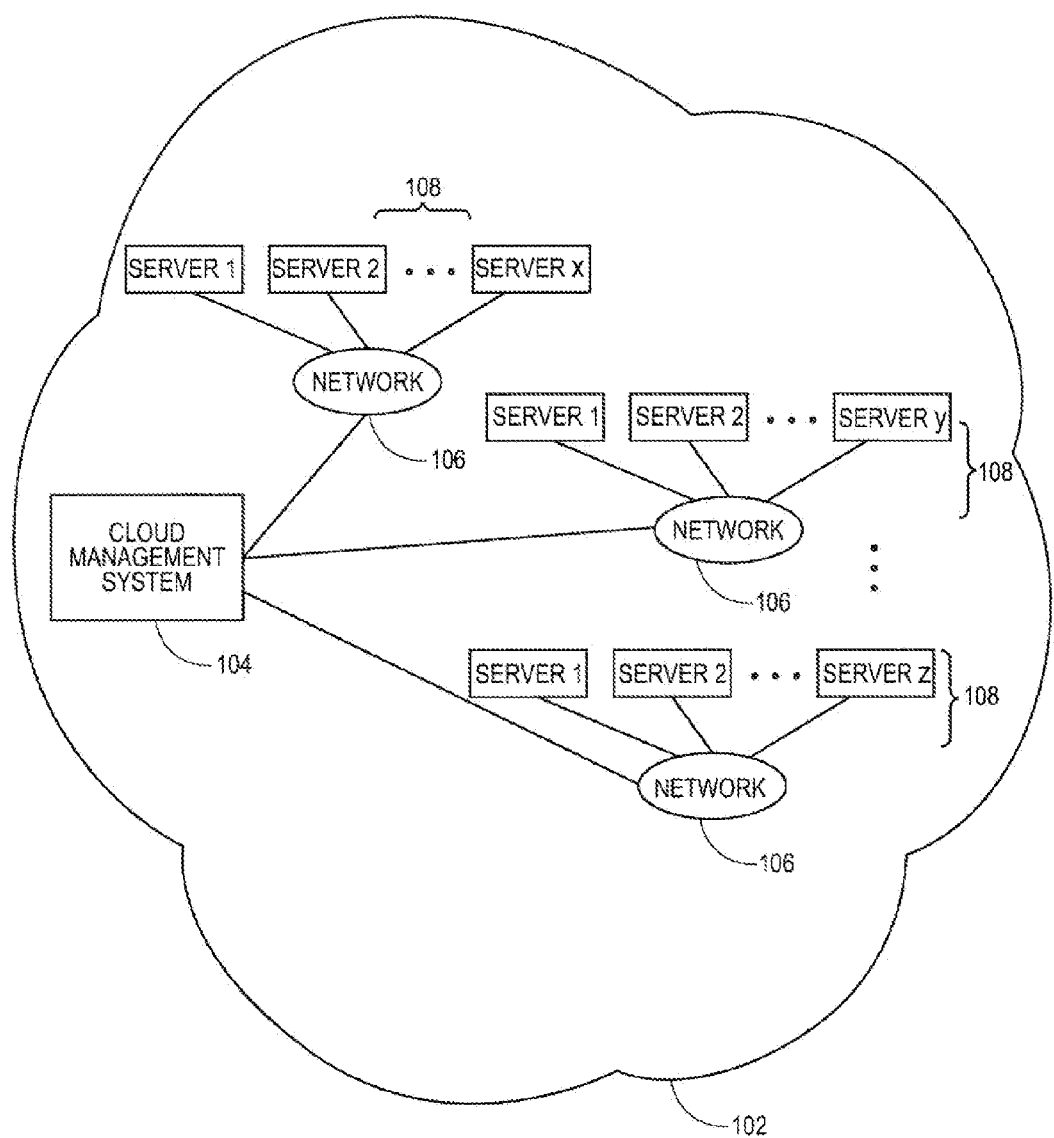
FIG. 1 illustrates an overall cloud system architecture in which various aspects of systems and methods for determining consistencies between host cloud data payloads and replicated data payloads can be practiced, according to embodiments.

Embodiments described herein can be implemented in or supported by a cloud network architecture. As used herein, a "cloud" can comprise a collection of hardware, software, services, and/or resources that can be invoked to instantiate a virtual machine, process, or other resource for a limited or defined duration. As shown for example in FIG. 1, the collection of resources supporting a cloud 102 can at a hardware level comprise a set of resource servers 108 configured to deliver computing components needed to instantiate a virtual machine, process, service, or other resource. For example, one group of resource servers in set of resource servers 108 can host and serve an operating system, and/or components, utilities, or interfaces related to that operating system, to deliver to a virtual target, and instantiate that machine with an image of that operating system. Another group of servers in set of resource servers 108 can accept requests to host computing cycles or processor time, memory allocations, communications ports or links, and/or other resources to supply a defined level of processing power or throughput for a virtual machine. A further group of resource servers in set of resource servers 108 can host and serve applications or other software to load on an instantiation of a virtual machine, such as an email client, a browser application, a messaging application, or other applications, software, or services. Other types of resource servers can be used to support one or more clouds 102.

In embodiments, the entire set of resource servers 108 and/or other hardware or software resources used to support one or more clouds 102, along with the set of instantiated virtual machines, can be managed by a cloud management system 104. The cloud management system 104 can comprise a dedicated or centralized server and/or other software, hardware, services, and network tools that communicate via network 106, such as the Internet or other public or private network, with all servers in set of resource servers 108 to manage the cloud 102 and its operation. To instantiate a new or updated set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The virtual machines can be instantiated as virtual client machines, virtual appliance machines consisting of special-purpose or dedicated-task machines as understood in the art, and/or as other virtual machines or entities. The request to invoke and instantiate the desired complement of virtual machines can be received and processed by the cloud management system 104, which identifies the type of virtual machine, process, or other resource being requested in that platform's associated cloud. The cloud management system 104 can then identify the collection of hardware, software, service, and/or other resources necessary to instantiate that complement of virtual machines or other resources. In embodiments, the set of instantiated virtual machines or other resources can, for example, and as noted, comprise virtual transaction servers used to support Web storefronts, Web pages, and/or other transaction sites.

In embodiments, the user's instantiation request can specify a variety of parameters defining the operation of the set of virtual machines to be invoked. The instantiation request, for example, can specify a defined period of time for which the instantiated collection of machines, services, or processes is needed. The period of time can be, for example, an hour, a day, a month, or other interval of time. In embodiments, the user's instantiation request can specify the instantiation of a set of virtual machines or processes on a task basis, rather than for a predetermined amount or interval of time. For instance, a user could request a set of virtual provisioning servers and other resources until a target software update is completed on a population of corporate or other machines. The user's instantiation request can in further regards specify other parameters that define the configuration and operation of the set of virtual machines or other instantiated resources. For example, the request can specify a specific minimum or maximum amount of processing power or input/output (I/O) throughput that the user wishes to be available to each instance of the virtual machine or other resource. In embodiments, the requesting user can for instance specify a service level agreement (SLA) acceptable for their desired set of applications or services. Other parameters and settings can be used to instantiate and operate a set of virtual machines, software, and other resources in the host clouds. One skilled in the art will realize that the user's request can likewise include combinations of the foregoing exemplary parameters, and others. It may be noted that "user" herein can include a network-level user or subscriber to cloud-based networks, such as a corporation, government entity, educational institution, and/or other entity, including individual users and groups of users.

When the request to instantiate a set of virtual machines or other resources has been received and the necessary resources to build those machines or resources have been identified, the cloud management system 104 can communicate with one or more set of resource servers 108 to locate resources to supply the required components. Generally, the cloud management system 104 can select servers from the diverse set of resource servers 108 to assemble the various components needed to build the requested set of virtual machines, services, or other resources. It may be noted that in some embodiments, permanent storage, such as optical storage or hard disk arrays, may or may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in one or more clouds 102 can be accessed and leveraged as needed. For example, other software or services that are provided outside of one or more clouds 102 acting as hosts, and are instead hosted by third parties outside the boundaries of those clouds, can be invoked by in-cloud virtual machines or users. For further example, other non-cloud hardware and/or storage services can be utilized as an extension to the one or more clouds 102 acting as hosts or native clouds, for instance, on an on-demand, subscribed, or event-triggered basis.

With the resource requirements identified for building a network of virtual machines, the cloud management system 104 can extract and build the set of virtual machines or other resources on a dynamic, on-demand basis. For example, one set of resource servers 108 may respond to an instantiation request for a given quantity of processor cycles with an offer to deliver that computational power immediately and guaranteed for the next hour or day. A further set of resource servers 108 can offer to immediately supply communication bandwidth, for example on a guaranteed minimum or best-efforts basis, for instance over a defined window of time. In other embodiments, the set of virtual machines or other resources can be built on a batch basis, or at a particular future time. For example, a set of resource servers 108 may respond to a request for instantiation of virtual machines at a programmed time with an offer to deliver the specified quantity of processor cycles within a specific amount of time, such as the next 12 hours. Other timing and resource configurations are possible.

After interrogating and receiving resource commitments from the set of resource servers 108, the cloud management system 104 can select a group of servers in the set of resource servers 108 that match or best match the instantiation request for each component needed to build the user's requested virtual machine, service, or other resource. The cloud management system 104 for the one or more clouds 102 acting as the destination for the virtual machines can then coordinate the integration of the identified group of servers from the set of resource servers 108, to build and launch the requested set of virtual machines or other resources. The cloud management system 104 can track the identified group of servers selected from the set of resource servers 108, or other distributed resources that are dynamically or temporarily combined, to produce and manage the requested virtual machine population, services, or other cloud-based resources.

In embodiments, the cloud management system 104 can generate a resource aggregation table or other record that identifies the various selected sets of resource servers in set of resource servers 108 that will be used to supply the components of the set of instantiated virtual machines, services, or processes. The selected sets of resource servers can be identified by unique identifiers such as, for instance, Internet protocol (IP) addresses or other addresses. In aspects, different sets of servers in set of resource servers 108 can be selected to deliver different resources to different users and/or for different applications. The cloud management system 104 can register the finalized group of servers in the set resource servers 108 contributing to or otherwise supporting the set of instantiated machines, services, or processes.

The cloud management system 104 can then set up and launch the initiation process to instantiate the virtual machines, processes, services, and/or other resources to be hosted and delivered from the one or more clouds 102. The cloud management system 104 can for instance transmit an instantiation command or instruction to the registered group of servers in the set of resource servers 108. The cloud management system 104 can receive a confirmation message back from each registered server in set of resource servers 108 indicating a status or state regarding the provisioning of their respective resources. Various registered resource servers may confirm, for example, the availability of a dedicated amount of processor cycles, amounts of electronic memory, communications bandwidth, services, and/or applications or other software prepared to be served and delivered.

Figure 2:
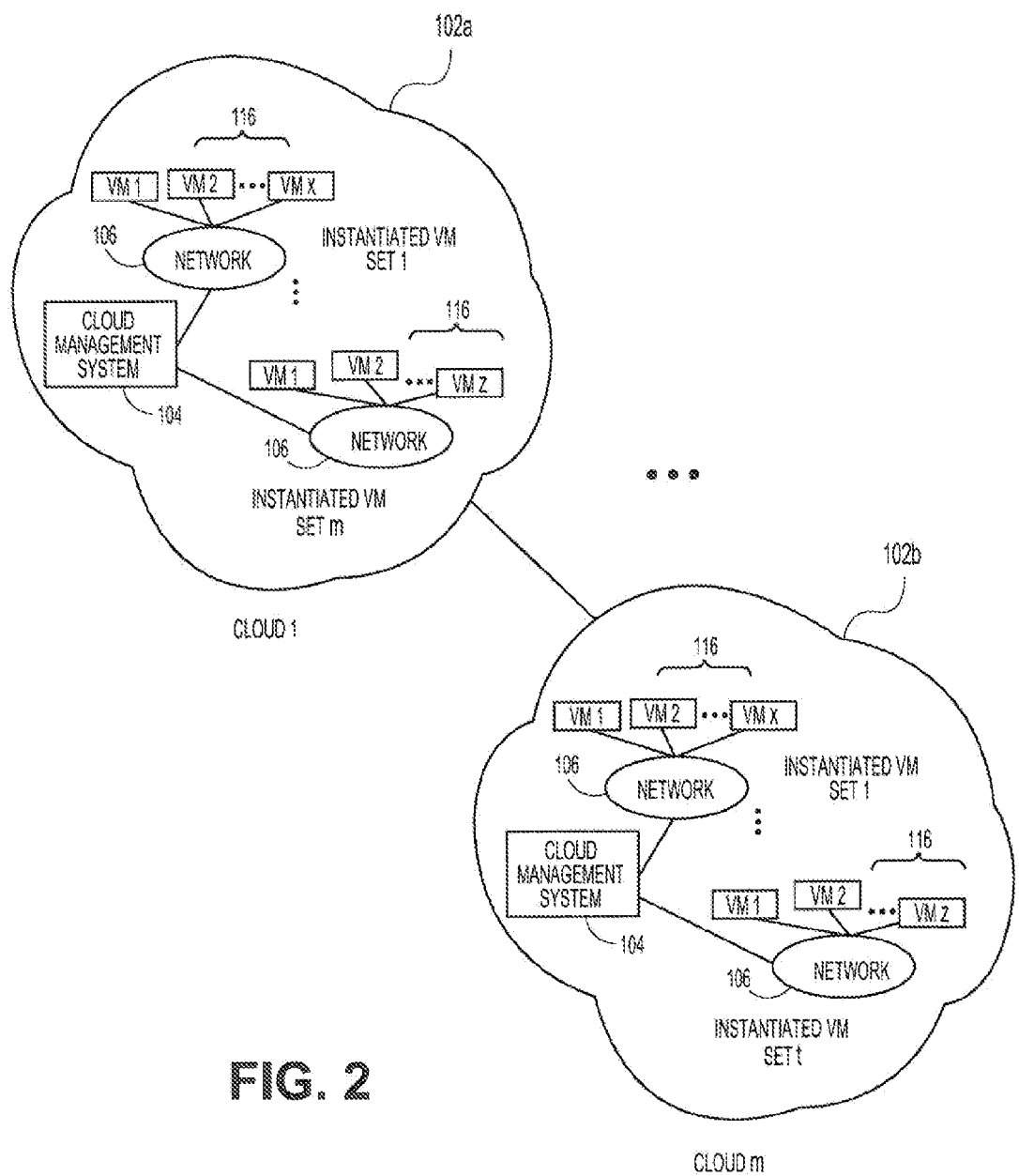
FIG. 2 illustrates an overall cloud system architecture in which various aspects of systems and methods for determining consistencies between host cloud data payloads and replicated data payloads can be practiced, in further regards.

As shown for example in FIG. 2, after coordination of the sources and configuration of resources including the hardware layer, selected software, and/or other resources, the cloud management system 104 can then instantiate a set of virtual machines 116, and/or other appliances, services, processes, and/or entities, based on the resources supplied by servers within set of resource servers 108 registered to support the one or more clouds 102 in a multiple-cloud network 110. According to aspects, cloud management system 104 can access or interact with a virtualization module, platform, or service to instantiate and operate set of virtual machines 116, such as the kernel-based virtualization manager (KVM™) available from Red Hat, Inc. of Raleigh, N.C., or others. In embodiments, the cloud management system 104 can instantiate a given number, for example, 10, 500, 1000, 20,000, or other numbers or instances of virtual machines to populate one or more clouds 102 and be made available to users of that cloud or clouds. In aspects, users may access the one or more clouds 102 via the Internet, or other public or private networks. Each virtual machine can be assigned an instantiated machine ID that can be stored in the resource aggregation table, or other record or image of the instantiated virtual machine population. Additionally, the cloud management system 104 can store data related to the duration of the existence or operation of each operating virtual machine, as well as the collection of resources utilized by the overall set of instantiated virtual machines 116.

In embodiments, the cloud management system 104 can further store, track and manage each user's identity and associated set of rights or entitlements to software, hardware, and other resources. Each user that operates a virtual machine or service in the set of virtual machines in the cloud can have specific rights and resources assigned and made available to them, with associated access rights and security provisions. The cloud management system 104 can track and configure specific actions that each user can perform, such as the ability to provision a set of virtual machines with software applications or other resources, configure a set of virtual machines to desired specifications, submit jobs to the set of virtual machines or other host, manage other users of the set of instantiated virtual machines 116 or other resources, and/or other privileges, entitlements, or actions. The cloud management system 104 associated with the virtual machine(s) of each user can further generate records of the usage of instantiated virtual machines to permit tracking, billing, and auditing of the resources and services consumed by the user or set of users. In aspects of the present teachings, the tracking of usage activity for one or more users (including network level users and/or end-users) can be abstracted from any one cloud to which that user is registered, and made available from an external or independent usage tracking service capable of tracking software and other usage across an arbitrary collection of clouds, as described herein. In embodiments, the cloud management system 104 of an associated cloud can for example meter the usage and/or duration of the set of instantiated virtual machines 116, to generate subscription and/or billing records for a user that has launched those machines. In aspects, tracking records can in addition or instead be generated by an internal service operating within a given cloud. Other subscription, billing, entitlement and/or value arrangements are possible.

The cloud management system 104 can configure each virtual machine in set of instantiated virtual machines 116 to be made available to users via one or more networks 106, such as the Internet or other public or private networks. Those users can for instance access set of instantiated virtual machines 116 via a browser interface, via an application server such as a Java™ server, via an application programming interface (API), and/or other interface or mechanism. Each instantiated virtual machine in the set of instantiated virtual machines 116 can likewise communicate with its associated cloud management system 104 and the registered servers in set of resource servers 108 via a standard Web application programming interface (API), or via other calls, protocols, and/or interfaces. The set of instantiated virtual machines 116 can likewise communicate with each other, as well as other sites, servers, locations, and resources available via the Internet or other public or private networks, whether within a given cloud in one or more clouds 102, or between those or other clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the one or more clouds 102. In embodiments, the set of virtual machines 116 or other services, machines, or resources may not depend in any degree on or require the user's own on-premise hardware or other resources. In embodiments, a user can therefore request and instantiate a set of virtual machines or other resources on a purely off-premise basis, for instance to build and launch a virtual storefront, messaging site, and/or any other application. Likewise, one or more clouds 102 can also be formed in whole or part from resources hosted or maintained by the users of those clouds, themselves.

Because the cloud management system 104 in one regard specifies, builds, operates and manages the set of instantiated virtual machines 116 on a logical or virtual level, the user can request and receive different sets of virtual machines and other resources on a real-time or near real-time basis, without a need to specify, install, or configure any particular hardware. The user's set of instantiated virtual machines 116, processes, services, and/or other resources can in one regard therefore be scaled up or down immediately or virtually immediately on an on-demand basis, if desired. In embodiments, the set of resource servers 108 that are accessed by the cloud management system 104 to support the set of instantiated virtual machines 116 or processes can change or be substituted, over time. The type and operating characteristics of the set of instantiated virtual machines 116 can nevertheless remain constant or virtually constant, since instances are assembled from a collection of abstracted resources that can be selected and maintained from diverse sources based on uniform specifications. Conversely, the users of the set of instantiated virtual machines 116 can also change or update the resource or operational specifications of those machines at any time. The cloud management system 104 and/or other logic can then adapt the allocated resources for that population of virtual machines or other entities, on a dynamic basis.

In terms of network management of the set of instantiate virtual machines 116 that have been successfully configured and instantiated, the one or more cloud management systems 104 associated with those machines can perform various network management tasks including security, maintenance, and metering for billing or subscription purposes. The cloud management system 104 of one or more clouds 102 can, for example, install, initiate, suspend, or terminate instances of applications or appliances on individual machines. The cloud management system 104 can similarly monitor one or more operating virtual machines to detect any virus or other rogue process on individual machines, and for instance terminate an application identified as infected, or a virtual machine detected to have entered a fault state. The cloud management system 104 can likewise manage the set of instantiated virtual machines 116 or other resources on a network-wide or other collective basis, for instance, to push the delivery a software upgrade to all active virtual machines or subsets of machines. Other network management processes can be carried out by cloud management system 104 and/or other associated logic.

In embodiments, more than one set of virtual machines can be instantiated in a given cloud at the same time, at overlapping times, and/or at successive times or intervals. The cloud management system 104 can, in such implementations, build, launch and manage multiple sets of virtual machines as part of the set of instantiated virtual machines 116 based on the same or different underlying set of resource servers 108, with populations of different virtual machines such as may be requested by the same or different users. The cloud management system 104 can institute and enforce security protocols in one or more clouds 102 hosting one or more sets of virtual machines. Each of the individual sets or subsets of virtual machines in the set of instantiated virtual machines 116 can be hosted in a respective partition or sub-cloud of the resources of the main cloud 102. The cloud management system 104 of one or more clouds 102 can for example deploy services specific to isolated or defined sub-clouds, or isolate individual workloads/ processes within the cloud to a specific sub-cloud or other sub-domain or partition of the one or more clouds 102 acting as host. The subdivision of one or more clouds 102 into distinct transient sub-clouds, sub-components, or other subsets which have assured security and isolation features can assist in establishing a multiple user or multi-tenant cloud arrangement. In a multiple-user scenario, each of the multiple users can use the cloud platform as a common utility while retaining the assurance that their information is secure from other users of the same one or more clouds 102. In further embodiments, sub-clouds can nevertheless be configured to share resources, if desired.

In embodiments, and as also shown in FIG. 2, the set of instantiated virtual machines 116 generated in a first cloud in one or more clouds 102 can also interact with a set of instantiated virtual machines, services, and/or processes generated in a second, third or further cloud in one or more clouds 102, comprising a multiple-cloud network 110. The cloud management system 104 of a first cloud of one or more clouds 102 can interface with the cloud management system 104 of a second, third, or further cloud of one or more clouds 102 to coordinate those domains and operate the clouds and/or virtual machines, services, and/or processes on a combined basis. The cloud management system 104 of a given cloud on one or more clouds 102 can in aspects track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, government, and/or other entity. In embodiments, the user can be or include another virtual machine, application, service and/or process. In further embodiments, multiple users or entities can share the use of a set of virtual machines or other resources.

In aspects, the cloud management system 104 and/or other logic or service that manages, configures, and tracks cloud activity can be configured to interact with other sites, platforms, engines, servers, and/or associated services that are configured to organize and manage the transport and delivery of existing data stores from on-premise databases or other sources, and stage that data to data storage resources at, near, co-hosted, or otherwise in geographic proximity to a set of host storage clouds in which that data payload will be placed and stored. In aspects, the cloud distribution data service (which may be referred to as "CDD", "CDD service," "data delivery service," or other references herein) can be located at the network edge to either or both of the premise data sources, and/or the set of host storage clouds. In aspects, this staging or staggering of potentially large-scale or very large-scale data stores can permit the connection between the data source(s), intermediate or staged data stores, and/or the host cloud data stores using dedicated and/or high-bandwidth lines, channels, or connections to permit the efficient and timely porting of that data to a host storage cloud or clouds of the user's choice. In aspects, the data payload or portions thereof can be located, extracted and transmitted as an image or copy of the subject data, with the original cloud-hosted being preserved in the set of host storage clouds. In aspects, the data payload and/or portions thereof can be located, extracted, and transmitted without leaving the original data stored in the set of host storage clouds, such as by deleting that data upon reading-out, or using other techniques.

Figure 3:
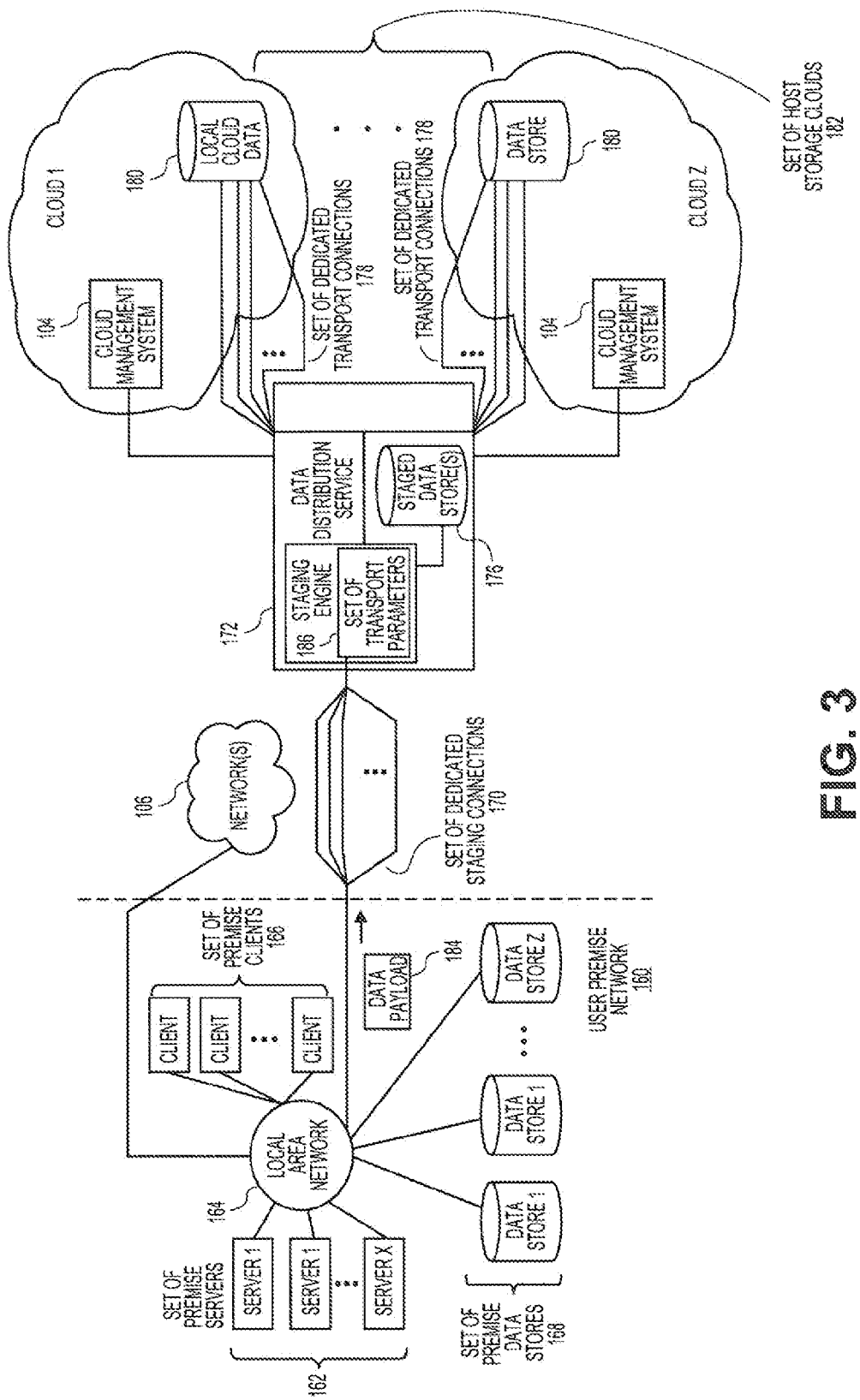
FIG. 3 illustrates a network configuration in which a data distribution service can be established between a premise network and host storage cloud, according to various embodiments.

In those regards, FIG. 3 illustrates a network implementation in which, in various cases, an administrator, owner, operator, and/or other user of a premise network 160 may wish to consider identifying, collecting, and migrating or transporting their databases, data files, and/or other data assets to a set of host storage clouds 182. In aspects and merely illustratively, the premise network 160 can contain or include on-premise, bare-metal, and/or other virtual or physical assets including a set of premise servers 162, a set of premise clients 166, one or more local area networks (LANs) 164 such as an Ethernet™ or Wifi™ network, a virtual private network (VPN), and/or other networks or connection topologies. The premise network 160 can include or interface to one or more networks 106, such as the public Internet and/or other public or private networks.

The premise network 160 can likewise include a set of premise data stores 168, such as one or more databases, data stores, servers, redundant arrays of inexpensive disks (RAID) installations, optical or solid-state storage or devices, and/or other data storage repositories, resources, or assets. In aspects, the set of premise data stores 168 can store different types of data, including, for example, technical, medical, financial, customer, inventory, scientific, and/or other data. The data hosted or stored in the set of premise data stores 168 can comprise significantly or substantially large-scale data, for example data or files comprising terabytes or other amounts of data. For instance, the administrator, owner, operator, and/or other user of a corporation, hospital, educational institution, government body, and/or other entity may collect and maintain a set of data in a set of premise data stores 168 such as local databases, data centers, database files and/or engines, repositories, and/or other data assets, services, and/or other storage sites of resources. In cases, the set of premise data stores 168 can host and store a significant or substantial amount of data, such as terabytes, petabytes, exabytes, yottabytes, and/or other amounts of data. In aspects, the administrator, owner, operator, and/or other user responsible for hosting and/or maintaining that data in the set of premise data stores 168 may, for various reasons, wish to migrate some or all of that data to one or more local cloud data stores 180 in the set of host storage clouds 182, such as to leverage cost, maintenance, capacity, security, and/or other advantages or factors available in the set of host storage clouds 182.

In aspects, it can be the case that if the owner, administrator, and/or other user of the user premise network 160 attempted to transport a significant amount of the data stored in the set of premise data stores 168 via one or more networks 106 such as the Internet in an unmanaged fashion, the comparatively low bandwidth or lack of reliability in the packet-switched public Internet could render the data transfer difficult, impractical, unfeasible, or impossible due to the limitations of those types of channels or connections. The upload of terabytes or other amounts of data over public Internet or similar connections could require days of time or more, and data integrity or reliability issues could also affect the effectiveness of data migration attempted in that manner.

According to aspects, systems and methods for staged data migration between data sources and cloud-based storage networks according to the present teachings can be deployed to assist in reducing, avoiding, or eliminating those and other types of performance degradations and other factors having a potential negative impact on the transport of data from on-premise and/or other sources to the set of host storage clouds 182 and/or other cloud-based storage assets, services, or resources. In implementations of the present teachings, a data distribution service 172 can accordingly be established or deployed as an independent service or access point, available publicly or privately to potential subscribers to the set of host storage clouds 182, to condition, prepare, receive, and stage incoming data payloads or data sets for delivery to an eventual cloud storage host, using enhanced, dedicated, and/or otherwise managed connections to reduce data transport time, to improve transfer reliability and/or security, and/or to provide other factors or benefits. In aspects, the data distribution service 172 can establish or maintain physical points of presence (PoPs) and/or other connections to one or more networks 106, such as the Internet and/or other public or private networks, through which users or potential users can connect to the data distribution service 172 and its associated resources, logic, and services. According to aspects, the data distribution service 172 can host or execute a staging engine 174 that can contain software application, operating system, and/or other logic or resources to manage the transport and delivery of a data payload 184 from the set of premise data stores 168 and/or other sources to a set of host storage clouds 182. In aspects, the data distribution service 172 can be configured to communicate directly or indirectly with the cloud management system 104 of each of the set of host storage clouds 182, for instance via the Internet and/or other public or private networks or connections. In aspects, the data distribution service 172 can also maintain a set of staged data stores 176, such as databases, data stores, servers, and/or other data assets or resources with which to store and stage the data payload 184 for migration into one or more local cloud data stores 180 hosted in the set of host storage clouds 182. In aspects, each cloud in the set of host storage clouds 182 can host one or multiple local cloud data stores 180.

According to implementations of the present teachings, the data distribution service 172 can operate to manage, organize, and/or enhance or optimize the transfer of the data payload 184 from the set of premise data stores 168 and/or other sources by staggering, staging, pre-staging, conditioning, and/or otherwise manipulating and administering the transfer of the data payload 184 to the set of staged data stores 176 via sets of selectable and/or configurable channels or connections. In aspects, those channels or connections can be or include a set of dedicated staging connections 170 that connect the user premise network 160 to the data distribution service 172 and the set of staged data stores 176. In aspects, the set of dedicated staging connections 170 can be or include any one or more of asynchronous transfer mode (ATM) networks or connections, wide area networks (WANs) or connections, metropolitan area networks (MANs) or connections, fiber optical connections such as synchronous optical networking (SONET) or synchronous digital hierarchy (SDH) connections, wireless connections, cable or wireline connections, virtual private networks (VPNs) or connections, and/or other channels or connections. In aspects, the connections in the set of dedicated staging connections 170 can be or include channels or connections can having a relatively high-capacity bandwidth or service level, such as for instance tens of megabytes per second, hundreds of megabytes per second, gigabytes per second, tens of gigabytes per second, hundreds of gigabytes per second, terabytes per second, and/or other data transfer rates or bandwidth ratings or capacities. In aspects, any one or more of the connections or channels in the set of dedicated staging connections 170 can comprise connections which are leased by a user on a temporary, demand-triggered, long-term, and/or other basis. And one or more of the connections or channels in the set of dedicated staging connections 170 can be or include permanent or dedicated channels, line, and/or connections, dynamically routed or configured channels or connections, and/or other channels or connections.

In aspects, the administrator, owner, operator, and/or other user of the user premise network 160 can specify a set of conditions, criteria, and/or other parameters to govern the transport of the data payload 184 during delivery to the data distribution service 172 and/or to the eventual set of host storage clouds 182, which information can be stored or encoded in a set of transport parameters 186, which can be stored in the staging engine 174 and/or other locations or stores. The set of transport parameters 186 can, for instance, specify a total amount of data to be include in the data payload 184 for delivery to the data distribution service 172, as well as a schedule over which or time by which the administrator, owner, operator, and/or other user wishes to conduct and complete the migration of the data payload 184 to the data distribution service 172. The set of transport parameters 186 can likewise include cost specifications, for instance, in cases where the cost of leasing or using any of the set of dedicated staging connections 170 is selectable or variable. The set of transport parameters 186 can also include further configuration parameters, such as any security or redundancy protocols or standards that the administrator, owner, operator, and/or other user wishes to apply to the transport of the data payload to the data distribution service 172, user access controls to the data payload 184 before or after transport has been initiated or completed. Other parameters, configuration settings, commands, scripts, and/or other criteria, variables, or conditions can be specified or indicated in the set of transport parameters 186.

As a merely illustrative example, the administrator, owner, operator, and/or other user can enter or encode the set of transport parameters 186 to indicate that a data transport event is desired to migrate the data payload 184 from the user premise network 160 under criteria that 1,000 terabytes of data is to be transported by an ending time of 12:00 midnight on a specified data, at an average cost of not more than $0.25 per megabyte and with the data payload 184 encrypted using the Data Encryption Standard (DES) and/or other encryption or security protocol, and with the data payload 184 to be stored in the set of staged data stores 176 of the data distribution service 172 in XML (extensible markup language) or other format. The set of transport parameters 186 can be selected, entered, and/or otherwise transmitted from the user premise network 160 or other site to the data distribution service 172, for instance via a selector tool, Web browser, and/or other application or interface. The set of transport parameters 186 can, in aspects, in whole or part specify the set of dedicated staging connections 170 to be used for delivery of the data payload 184 and/or associated information to the data distribution service 172, for instance via manual selection or input received from the administrator, owner, operator, and/or other user.

In aspects, the data payload 184 and/or associated information can be migrated or transported partly or entirely via the set of dedicated staging connections 170. For instance, the administrator, owner, operator, and/or other user may transmit some of the data payload 184 and/or associated information via the one or more networks, in addition to the set of dedicated staging connections 170. For example, configuration commands, the set of transport parameters 186 or portions of or updates to the set of transport parameters 180, can be transmitted via the one or more networks 106, for instance via the public Internet, since in aspects comparatively higher-bandwidth connections may not be necessary to transmit relatively small amounts of commands and/or data or elements of the data. In cases, the one or more networks 106 can in addition or instead transport at least a portion of the data payload 184, for instance, to transmit supplemental data or attributes whose delivery target time is not immediate or a high priority. Other combinations of the one or more networks 106, the set of dedicated staging connections 170, other networks or connections, and/or combinations thereof can be used.

In aspects, after transport of the data payload 184 to the set of staged data stores 176 of the data distribution service 172 has been completed, the data distribution service 172 can finalize the installation, storage, and/or hosting of the data payload 184 and/or associated information in the one or more local cloud data stores 180 before initiating activities related to further transport of the data payload 184 to the one or more local cloud data stores 180 of one or more of the set of local host storage clouds 182. The data distribution service 172 can store, host, and maintain the data payload 184 in the set of staged data stores 176 for temporary, short-term, and/or longer or other periods, depending on the set of transfer parameters 186 and/or other factors. For instance, the staging engine 174 of the data distribution service 172 can determine that the administrator, owner, operator, and/or other user has specified or requested that the transfer of the data payload 184 into the one or more local cloud data stores 180 of one or more of the set of local host storage clouds 182 be initiated by 9:00 p.m. on a certain date. To satisfy that scheduling criterion, the staging engine 174 can identify the size and/or type of data in the data payload 184, analyze or estimate the bandwidth available in the set of dedicated staging connections 170, and set a target delivery completion time of 11:00 p.m. on the specified delivery date, taking into account the interval of time that will be necessary to transport the data payload 184 over the available bandwidth of the selected channels in the set of dedicated staging connections 170 to complete transfer of the data payload 184 by 11:00 p.m. on that scheduled date. If the transport process proceeds to complete by the calculated completion time of 11:00 p.m. on that date, the data of the data payload 184 and/or any associated information can accordingly reside in the set of staged data stores 176 of the data distribution service 172 for one hour before the staging engine 174 initiates the further or next-stage migration or transport of the data payload 184 to the one or more local cloud data stores 180 of one or more of the set of local host storage clouds 182. The set of staged data stores 176 of the data distribution service 172 can host the data payload 184 and/or associated information for lesser or greater amounts of times, for instance, for periods of minutes, hours, days, weeks, months, and/or other period or intervals, depending on the set of transfer parameters 186 and/or other factors. For instance, in an illustrative implementation involving payload data 184 including enterprise resource planning (ERP) data related to a chemical or automotive factory, the manufacturing data, materials deliveries and costs, factory repair or maintenance events or schedules, and/or other data may be tracked, stored, and updated on a monthly cycle. In those or other implementations, the administrator, owner, operator, and/or other user may specify that the data payload 184 encapsulating that ERP and/or other data can or should be migrated over a period of 30 days and/or before the next regular update cycle, in which case the data distribution service 172 may determine that the data payload 184 can be extracted to the data distribution service 172 over a period of 30 days, for instance so as to use a comparatively lower amount of bandwidth in the set of dedicated staging connections 170 and thereby incur less connection leasing costs. In cases where the set of staged data stores 176 of the data distribution service 172 stores, hosts, and/or maintains the data payload 184 over significant intervals of time, such as days or weeks of time, and/or other intervals or periods, the data distribution service 172 can also apply or enforce data conditioning or maintenance standards or procedures on the data payload 184 or other information. For example, in cases where the data payload 184 includes medical information, the data distribution service 172 can apply user access controls such as username/password authentication and/or data encryption, for instance to satisfy the requirements of the Health Insurance Portability and Accountability Act (HIPPA), the requirements of the Sarbanes-Oxley Act (SOX), or other regulatory or compliance stipulations or requirements. Other compliance, management, and/or security protocols can be applied to the data payload 184 and/or other information stored in the set of staged data stores 176 of the data distribution service 172, regardless of the duration of time that information is staged in the data distribution service 172. For instance, during the period that the data payload 184 resides or is hosted in the data distribution service 172, the data distribution service 172 can also communicate with the user premise network 160 to interrogate that source network for any incremental or other updates to the data payload 184, and incorporate those updates into the data payload 184 stored in the set of staged data stores 176 of the data distribution service 172. Other data conditioning or processing can be performed on the data payload 184 while hosted or stored in the set of staged data stores 176 of the data distribution service 172.

In aspects, the data distribution service 172 can be installed, configured, and/or located in geographic proximity to the set of host storage clouds 182, the one or more local cloud data stores 180, and/or other network elements or sites. As used or described in this application, in aspects, locations within geographic proximity to each other can be or include locations or sites located within the same city or metropolitan area, and/or within the same general region, such as within a state in the U.S. and/or a multi-state region generally recognized as constituting a cohesive geographic region, such as, merely for example, the New York-New Jersey-Connecticut tri-state area, and/or others. In aspects, locations within geographic proximity to each other can also or instead be or include areas or regions within which direct, continuous, connectable, configurable, leasable, primary, and/or otherwise uninterrupted or unmediated physical or wireless connections are available to establish communications links between two or more network points, sites, and/or entities within a geographic region, section, and/or area. In aspects, network sites, points including physical points of presence (PoPs), and/or other elements can be considered to be within geographic proximity to each other is those sites or points can be connected directly or essentially directly via comparatively high-bandwidth channels or connections, and/or without resorting to connections via the public Internet. For example, network sites, points including physical points of presence (PoPs), and/or other elements can be considered to be within geographic proximity to each other if those sites, points, and/or other elements can be connected directly or essentially directly via one or more wide area networks (WANs), metropolitan area networks (MANs), optical connections such as synchronous optical network (SONET) connections, and/or other comparatively high-bandwidth channels or connections, as will be understood by persons skilled in the art. While in aspects network sites, points including physical points of presence (PoPs), and/or other elements can be considered as being within geographic proximity based on various physical, functional, and/or logical factors, in aspects, and purely illustratively, network sites, points including physical points of presence (PoPs), and/or other elements that can be classified or considered as being within geographic proximity can be located within distances of miles, tens of miles, hundreds of miles, and/or lesser or greater distances of each other. Other factors, parameters, criteria, and/or considerations can be used to determine geographic proximity between network sites, points including physical points of presence (PoPs), and/or other elements as described herein.

Upon meeting, reaching, and/or otherwise satisfying the scheduled time, criteria, and/or conditions to initiate the further transfer of the data payload 184 and/or associated information to the set of host storage clouds 182, the data distribution service 172 and/or other logic or service can begin the processing to migrate that data or information to the one or more local cloud data stores 180 of one or more clouds in the set of host storage clouds 182. In aspects, the delivery of the data payload 184 and/or associated information to the set of host storage clouds 182 can be initiated at a scheduled time, such as a time specified in the set of transport parameters 186 and/or other commands or configuration data. In aspects, the delivery of the data payload 184 and/or associated information to the set of host storage clouds 182 can be initiated on an event-triggered basis, such as one hour or one day after completion of the transport of the data payload 184 to the data distribution service 172. In aspects, the delivery of the data payload 184 and/or associated information to the set of host storage clouds 182 can also or instead be initiated by manual selection or command, for instance, by a selection or command inputted by the administrator, owner, operator, and/or other user. Other conditions, commands, schedules, events, and/or criteria can be used to identify a time at which to begin, pause, continue, and/or otherwise deliver the data payload 184 and/or associated information from the data distribution service 172 to the one or more local cloud data stores 180 of one or more clouds in the set of host storage clouds 182.

In aspects, the data payload 184 and/or other information can be transported or transmitted from the data distribution service 172 to the set of host storage clouds 182 via a set of dedicated transport connections 178. In aspects, the set of dedicated transport connections 178 can connect the set of staged data stores 176 directly or indirectly to the one or more local cloud data stores 180 to migrate and install the data payload 184 and/or associated information in the one or more local cloud data stores 180. In aspects, the set of dedicated transport connections 178 can be or include connections or channels of the same general type or types as the set of dedicated staging connections 170, and/or can include additional, separate, and/or different channels or connections. In aspects, the set of staged data stores 176 can be located within geographic proximity or near-geographic proximity, in the senses noted herein, to one or more of the clouds in the set of host storage clouds 182 and/or the constituent elements of those clouds, including the cloud management system(s) 104 and/or one or more local cloud data stores 180. In aspects, the staging engine 174 and/or other logic or service can initiate and manage the transfer of the data payload 184 and/or image thereof stored or hosted in the set of staged data stores 176 to the one or more local cloud data stores 180 via the set of dedicated transport connections 178 on a scheduled, event-triggered, manually-specified, and/or other basis. The migration or transport of the data payload 184 and/or associated data can for instance be programmed to begin at a specified time on a specified date, and/or to begin upon the detection of specified events, such as validation of the data payload 184 and/or associated data using error correction, decryption, and/or other processing or protocols. In aspects, the migration or transport of the data payload 184 and/or associated data can be initiated by receipt of a command, input, and/or other signal from the administrator, owner, operator, and/or other user, for instance, received via a tool, interface, or browser operated by the admin in the user premise network 160 and/or other location or site.

After the transfer of the data payload 184 and/or other associated data has been initiated, the staging engine 174 and/or other logic or service can monitor the transport of that data while in-flight, for instance, to perform data validation of migrated data using for instance check-sum or other processing, encryption/decryption of the data while traversing the set of dedicated transport connections 178, and/or to perform other supervisory or monitoring tasks to ensure the integrity of the data being moved and the migration process. After the successful completion of all data transport, validation, security, and/or other processing required for migration of the data payload 184 and/or related information, the staging engine 174 can detect, confirm, and/or declare the completion of the transfer of the data payload 184 and/or associated information to the set of host storage clouds 182. In aspects, the staging engine 174, one or more cloud management system(s) 104, and/or other logic can store and/or encode the data payload 184 and/or associated information in the one or more local cloud data stores 180 in various formats or configurations, such as, for example, any one or more of a database including relational databases, an object-oriented data object such as an extensible markup language (XML)-based object, a table, tree, linked list, and/or other data object, format, file, and/or configuration. In aspects, the staging engine 174 can also perform any post-transfer activities that may be selected or required to complete the installation and storage of the data payload 184 and/or related information in the set of host storage clouds 182. In aspects, for instance, the the staging engine 174 and/or other logic or service can communicate with the user premise network 160 to indicate that the data payload 184 and/or associated information has been safely and/or completely migrated to the data distribution service 172, upon which notification the user premise network 160 can perform other actions, such as to delete and/or archive the data of the data. payload 184 from the set of premise data stores 168. Other actions can be taken by or in the user premise network 160.

For instance, upon completion of the data transport process, the staging engine 174 and/or other logic or service can likewise communicate with the cloud management system(s) 104 of one or more of the set of host storage clouds 182 to notify the one or more cloud management system(s) 104 of the installation and presence of the data payload 184 and/or associated data in the one or more local cloud data stores 180 of one or more of the clouds in the set of host storage clouds 182.

In aspects, after the successful or completed transport of the data payload 184 and/or associated information to the set of host storage clouds 182, the staging engine 174, cloud management system(s) 104, and/or other logic or service can for instance register the data payload 184 and/or associated data in the file storage system or systems used by the one or more cloud management system(s) 104 and/or set of host storage clouds 182. In aspects, registration of the data payload 184 and/or associated data in corresponding file storage system or systems maintained or operated by the one or more cloud management system(s) 104 and/or set of host storage clouds 182 can permit, for instance, virtual machines, operating systems, applications, and/or other software, services, and/or users of the set of host storage clouds 182 and/or other clouds or networks to access, read, retrieve, write, modify, and/or otherwise process the data payload 184 and/or associated information directly from or via the set of host storage clouds 182. In aspects, the staging engine 174 and/or other logic or service can at such times or at other times de-activate, release, and/or otherwise terminate some or all of the set of dedicated staging connections 170 and/or set of dedicated transport connections 178, as desired or scheduled.

Figure 4:
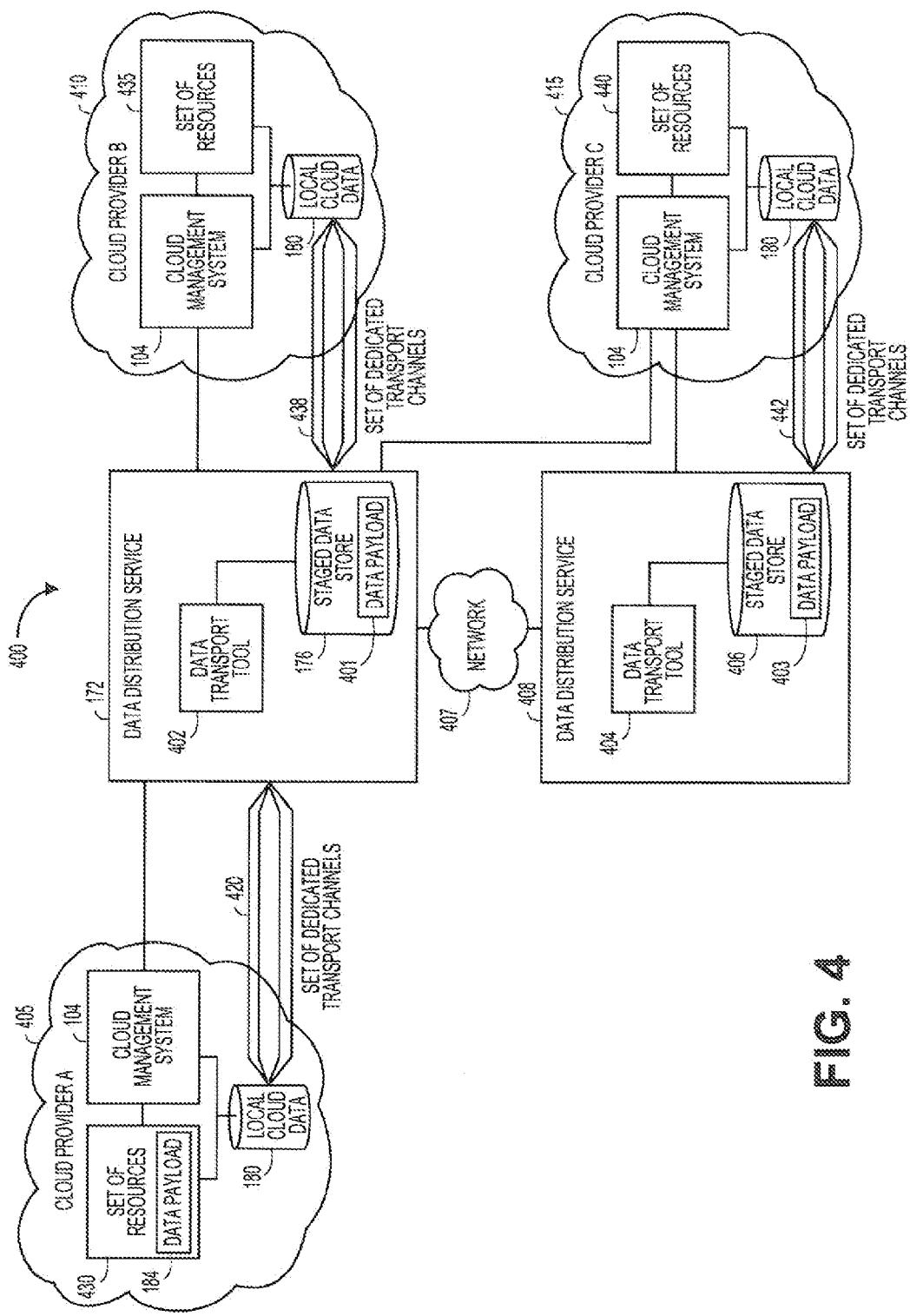
FIG. 4 illustrates a network configuration in which various aspects of systems and methods for determining consistencies between host cloud data payloads and replicated data payloads can be practiced, according to various embodiments.

FIG. 4 illustrates a network 400 in which, in various cases, an administrator, owner, operator, and/or other user associated with a data payload in a host cloud provider may wish to consider migrating or transporting the data payload and/or other data to another cloud provider. For example, as shown in FIG. 4, the administrator can have the data payload 184 in a set of resources 430 associated with cloud provider A 405. The administrator may wish to migrate the data payload 184 to another cloud provider for storage purposes, processing requirements, subscription rate decreases, and/or other reasons. In aspects, the data payload 184 could have been previously transported to cloud provider A 405 via the data distribution service 172 and a set of dedicated transport connections 420, or via other configurations.

In aspects, the data distribution service 172 can be connected to one or more target cloud providers. For example, as shown in FIG. 4, the data distribution service 172 can be connected to cloud provider B 410 and cloud provider C 415. In aspects, the data distribution service 172 can be connected to the target cloud providers via multiple connections such as, for example, a network connection or a set of dedicated transport channels 438, 442. Further, the data distribution service 172 can interface with components of the target cloud providers. For example, as shown in FIG. 4, the data distribution service 172 can interface with a cloud management system 104 and a set of resources 435 of cloud provider B 410, and with a cloud management system 104 and a set of resources 440 of cloud provider C 415, and other resources such as the local cloud data 180 of the respective target cloud networks.

The data distribution service 172 can comprise a data transport tool 402 that can facilitate the transportation, migration, and otherwise movement of data among components of the network 400. For example, the data transport tool 402 can direct the, transport of the data payload 184 to cloud provider A 405 via, for example, the set of dedicated transport channels 420. In aspects, the data transport tool 402 can be a component of any of the resources of FIG. 4 such as, for example, the cloud management system 104 of cloud provider A 405, the set of resources 430, or other resources.

According to aspects, the data transport tool 402 can replicate data on resources within the data distribution service 172 such as, for example, the staged data stores 176. For example, in addition to transporting the data payload 184 to cloud provider A 405, the data transport tool 402 can replicate a data payload 401 on the staged data stores 176, as shown in FIG. 4, such that the data payload 401 can be stored in the data distribution service 172 concurrently with the data payload 184 in cloud provider A 405. In aspects, the data transport tool 402 can replicate some or all of the data in the data payload 184 to form the data payload 401.

In aspects, the data transport tool 402 can further replicate data on storage devices associated with additional data distribution services, staging areas, or the like. For example, as shown in FIG. 4, the data transport tool 402 can transport the data payload 401 to an additional data distribution service 408 via a network 403 or other connection. The additional data distribution service 408 can comprise a data transport tool 404 that can perform similar or identical functionalities as the data transport tool 402. For example, the data transport tool 404 can replicate an additional data payload 403 on staged data stores 406 of the additional data distribution service 408. This way, once the data payload 184 is transported to cloud provider A 405, the data transport tools 402, 404 can replicate the respective data payloads 401, 403 on respective resources of the data distribution service 172 and the additional data distribution service 408. It should be appreciated that the data transport tools 402, 404 or other logic can replicate the data payload 184 on other resources not shown in FIG. 4, and can replicate the data payload 184 at any time before, during, or after the transport of the data payload 184 to cloud provider A 405, or to other cloud networks.

According to aspects, the data transport tool 402 can receive a request, a set of instructions, or any type of indication from the administrator of the data payload 184, and/or other administrators, to identify candidate target cloud providers to which to migrate the data payload 184. For example, as shown in FIG. 4, the data transport tool 402 can determine that cloud provider B 410 and/or cloud provider C 415 comprise resources, such as the set of resources 435 and the set of resources 440, respectively, to which to migrate the data payload 184 resident on resources associated with cloud provider A 405. In aspects, the data transport tool 402 can automatically initiate functionality related to identifying the candidate target cloud providers. In aspects, the administrator can specify one or more target cloud providers to which to migrate the data payload 184. For example, the administrator can request that the data payload 184 of cloud provider A 405 be migrated to cloud provider C 415.

The data transport tool 402 can identify any replications of the data payload 184 on any resources associated with a data distribution service, staging area, or the like. For example, prior to migrating the data payload 184 from cloud provider A 405, the data transport tool 402 can identify the data payload 401 that was replicated in the staged data stores 176 of the data distribution service 172 and the data payload 403 that was replicated on the staged data stores 406 of the additional data distribution service 408. In aspects, the data transport tool 402 can perform the identification in response to receiving a request from an administrator. It should be appreciated that the data transport tools 402, 404 or other logic can identify any replications of the data payload 184 on any resource of the network 400, or other components. In aspects, one or more replications of the data payload 184 can be stored on resources associated with target clouds, such as cloud provider B 410 and cloud provider C 415.

The data transport tool 402 can examine the data payloads 401, 403 replicated on the data distribution service 172, the additional data distribution service 408, or other resources. In aspects, the data transport tool 402 can compare the data payload 184 in cloud provider A 405 with any of the replicated versions of the data payload 401, 403 stored on either of the data distribution services 172, 408, to determine consistencies between or among the data payloads. For example, the data transport tool 402 can determine that the data payload 401 replicated in the staged data stores 176 is identical to the data payload 184 on cloud provider A 405. For further example, the data transport tool 402 can determine that the data payload 403 replicated in the staged data stores 406 is similar to the data payload 184 on cloud provider A 405. In aspects, the data transport tool 402 can identify any differences between data payloads and replicated versions of the data payloads. Further, in aspects, the data transport tool 402 can use any algorithm or technique to identify consistencies and/or differences such as, for example, SQL data compare, checksumming or hash summing of data, checksumming or hash summing of indexes of data, using a RedGate tool, and other techniques. It should be appreciated that the data transport tool 402 can examine and identify any consistencies and/or differences among any of the data payloads located in any cloud provider or replicated on any data distribution service.

In aspects, the data transport tool 402 can determine whether the data payload 184 in cloud provider A 405 needs to be or should be migrated to a target cloud, based on any consistencies with the replicated data payloads 401, 403. For example, the data transport tool 402 can determine that the data payload 401 stored on the staged data stores 176 meets or exceeds a consistency threshold, criteria, or other targets, with the data payload 184 in cloud provider A 405, and therefore that the data payload 184 in cloud provider A 405 need not be migrated to a target cloud. Instead, the data transport tool 402 can directly transport the data payload 401 stored in the staged data stores 176 to the specified target cloud.

In aspects, the data transport tool 402 can identify data payloads replicated or otherwise stored on any of the target clouds, such as cloud provider B 410 and cloud provider C 415. In response to determining that the data payload 184 on cloud provider A 405 is consistent with any of the replicated data payloads 401, 403, the data transport tool 402 can determine any consistencies between the replicated data payloads 401, 403 and data payloads stored on the target clouds. It should be appreciated that the data transport tool 402 can employ any consistency determination algorithm or technique as described herein. If the data transport tool 402 determines that any of the data payloads stored on the target clouds is consistent with any of the replicated data payloads 401, 403, then the data transport tool 402 can determine that the replicated data payload 401, 403 consistent with the target cloud data payload need not be transported to the target cloud because the target cloud already has a consistent data payload. Therefore, not only does the data payload 184 in cloud provider A 405 need not be transported to the data distribution services 172, 408, but the replicated data payloads 401, 403 on the data distribution services 172, 408 need not be transported to the target clouds, such as cloud provider B 410 and cloud provider C 415. As such, no transportation or migration of data is needed.

As an example, suppose an administrator of a financial institution desires to migrate a data payload in a source cloud to a target cloud, wherein the data payload comprises financial records of customers associated with the financial institution for the past five (5) years. The data transport tool 402 or other logic can located a replicated data payload on a data distribution service associated with the target cloud. Merely for example, the replicated data payload could have been replicated a few months prior to the administrator desiring to migrate the data payload. The data transport tool 402 can perform a consistency analysis on the data payload and the replicated data payload to determine that the two payloads are 90% consistent. If the administrator or another entity has set the consistency threshold at 95%, then the data transport tool 402 will not transport the replicated data payload to the target cloud, but will instead migrate the data payload from the source cloud to the target cloud. Alternatively, if the administrator or another entity has set the consistency threshold at 85%, then the data transport tool 404 can directly transport the replicated data payload stored on the data distribution service to the target cloud via, for example, a set of dedicated transport channels. This way, processing power, transport time, and other metrics and resources associated with retrieving the data payload from the source cloud can be eliminated. Further, a data distribution service provider can provide incentive to prospective customers by only charging the prospective customers once to move or replicate a data payload into the data distribution service, but then having the replicated data payload available for immediate transport to a target cloud.

It should be appreciated that any of the data transport tools 402, 404 can determine to transport none, some, or all of any replicated data payloads based on any amount of consistencies between the data payload in the host cloud and the replicated data payloads. Further, it should be appreciated that any of the data transport tools 402, 404 can migrate the data payload in the host cloud to the target cloud, via the respective data distribution services 172, 408, if the replicated data payloads do not meet a consistency threshold, or based on other factors. In aspects, the data transport tools 402, 404 can encrypt and/or decrypt the data payload during any transport or migration, and/or establish secure communication channels among any entities associated with the data distribution services 172, 408. Further, in aspects, the data transport tools 402, 404 can maintain a record of any consistency analysis performed on data payloads. This way, if data in the data payload 184 or the replicated data payloads 401, 403 is updated subsequent to a consistency analysis, then the data transport tools 402, 404 can only analyze the updated data, and incorporate the updated analysis with the recorded analysis.

In aspects, the data transport tool 402, 404 or other logic can present, to an administrator or other entities, a result of the consistency analysis, between the data payload 184 in cloud provider A 405 with any of the replicated data payloads 401, 403, or data payloads in any of the target clouds. For example, the result of the consistency analysis can detail which part(s) of the data payloads is consistent and which part(s) of the data payloads is different. The administrator or other entity can analyze the result of the consistency analysis to determine if some or all of the replicated data payloads 401, 403 can be transported to a target cloud in lieu of migrating the data payload 184 from cloud provider A 405 to the target cloud. In aspects, the analysis can be based on which parts of the data payloads are identical, similar, or different, or other factors. Further, in aspects, the result of the consistency analysis can be provided to an administrator via a graphical user interface of a client, or via other outlets.

In aspects, there can be multiple segments of a replicated data payload stored on multiple resources associated with a data distribution service. For example, the data payload 184 as illustrated in FIG. 4 can be replicated, divided, and stored as separate data blocks on both the staged data stores 176, 406. It should be appreciated that the data payload 184 can be replicated and/or divided in any way, and stored on any combination of resources. Further, either of the data transport tools 402, 404 can access and interface with any resources on which any segments of the replicated data payloads are stored, and can perform a consistency analysis on one or all of the segments, according to aspects as discussed herein. Still further, either of the data transport tools 402, 404 can transport any or all appropriate data payload segments to any target cloud from any resource on which the data payload segments are stored.

Figure 5:
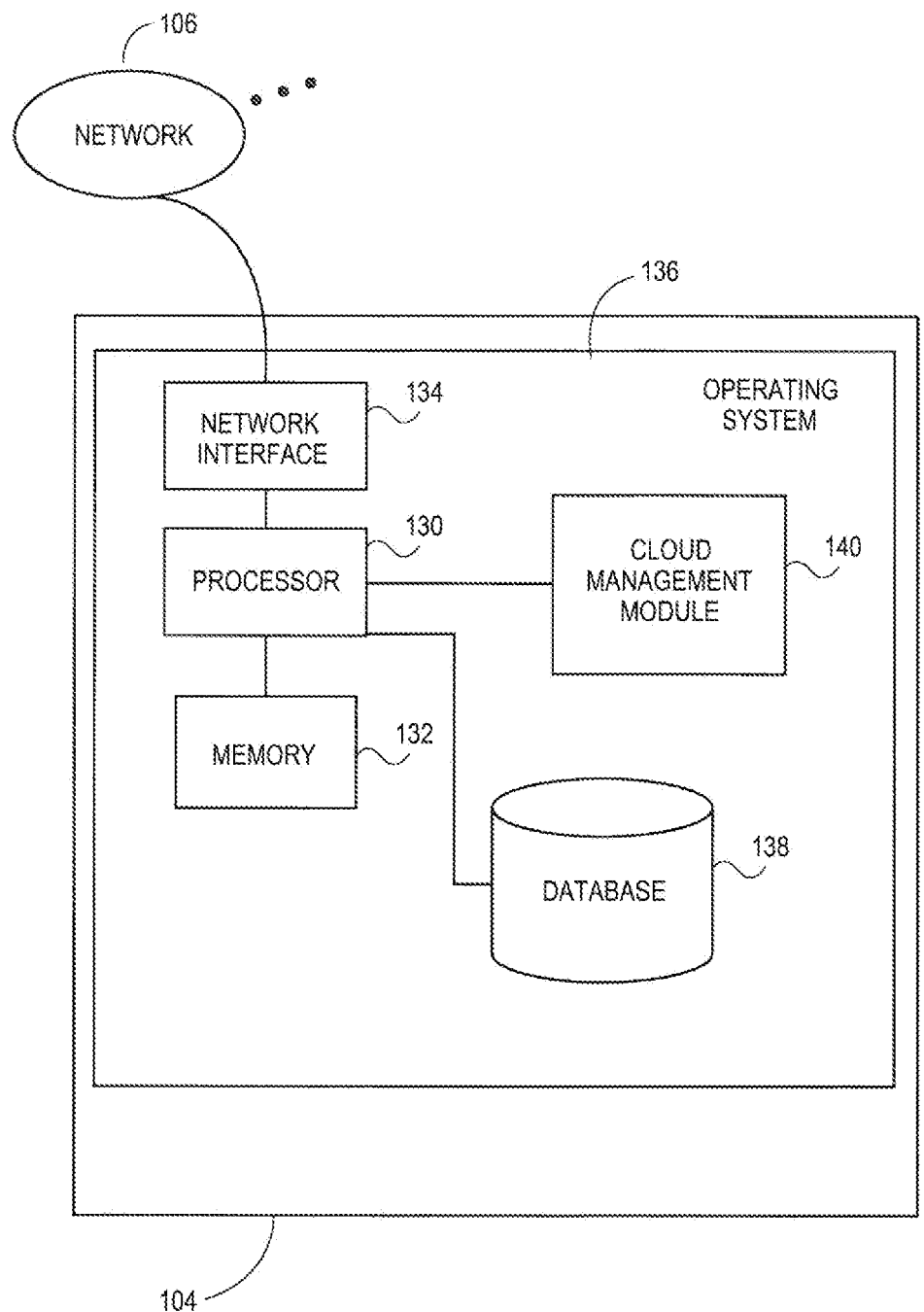
FIG. 5 illustrates an exemplary hardware configuration for a cloud management system that can support and maintain one or more cloud-based networks, according to various embodiments.

FIG. 5 illustrates an exemplary diagram of hardware and other resources that can be incorporated in a cloud management system 104 configured to communicate with the set of instantiated virtual machines 116, and/or other entities, services, or resources via one or more networks 106 and/or other connections, according to aspects. In embodiments as shown, the cloud management system 104 can comprise a processor 130 communicating with memory 132, such as electronic random access memory, operating under control of or in conjunction with an operating system 136. The operating system 136 can be, for example, a distribution of the Linux™ operating system, the Unix™ operating system, or other open-source or proprietary operating system or platform. The processor 130 also communicates with a database 138, such as a database stored on a local hard drive, and a cloud management module 140, to execute control logic and control the operation of virtual machines and other resources in one or more clouds 102, a set of target clouds, and/or other collections of clouds. The processor 130 further communicates with a network interface 134, such as an Ethernet or wireless data connection, which in turn communicates with the one or more networks 106, such as the Internet or other public or private networks. The processor 130 and/or the cloud management system 104 can likewise communicate with the data transport tool 402 of the data distribution service 172 or other staging area, and/or other interfaces, applications, services, and/or logic. Other configurations of the cloud management system 104, associated network connections, and other hardware, software, and service resources are possible. It may be noted that in embodiments, the data distribution service 172 and/or components thereof such as the data transport tool 402, and/or other hardware machines, platforms, or engines can comprise the same or similar resources as cloud management system 104, or can be configured with different hardware and software resources.

Figure 6:
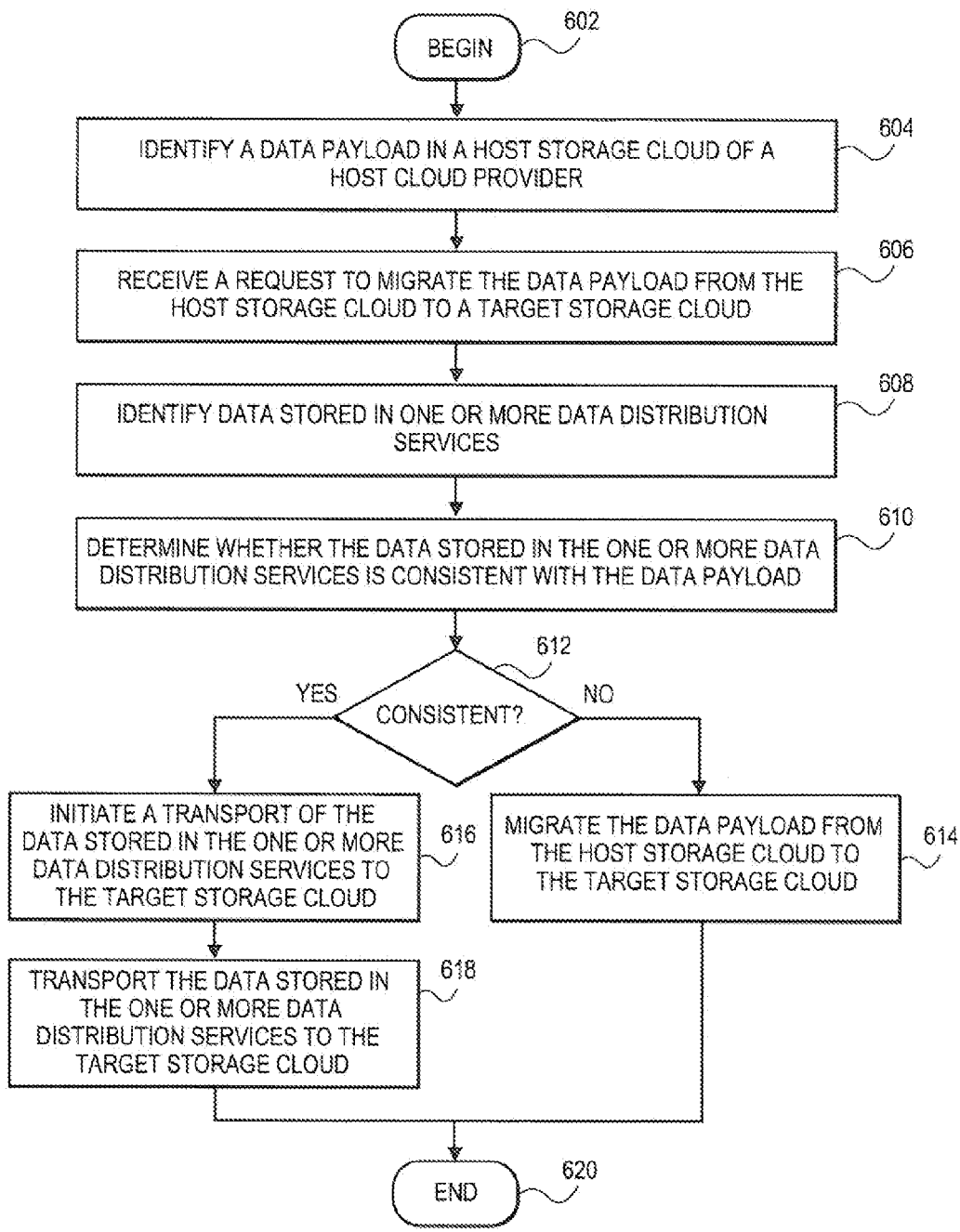
FIG. 6 illustrates a flowchart for configuring a replication of data and a transport of replicated data between clouds via a data distribution service, according to various embodiments.

FIG. 6 illustrates a flowchart of overall processing that can be used to configure a transfer of replicated data to one or more target cloud networks, according to various aspects of the present teachings. In 602, processing can begin. In 604, a data payload in a host storage cloud of a host cloud provider can be identified. In aspects, a data distribution service connected to the host storage cloud can identify the data payload. In 606, a request or set of instructions to migrate the data payload from the host storage cloud to a target storage cloud can be received. In aspects, the request can be received from an administrator or other entity associated with the data payload, the host storage cloud, and/or the host cloud provider.

In 608, data stored in one or more data distribution services can be identified. In embodiments, the data can be stored in a data distribution service associated with the host storage cloud or with the target storage cloud. In 610, it can be determined whether the data stored in the one or more data distribution services is consistent with the data payload. In embodiments, some or all of the data stored in the one or more data distribution services can be consistent with the data payload. In 612, if the data stored in the one or more data distribution services is not consistent with the data payload, then processing can proceed to 614 in which the data payload can be migrated to the target storage cloud. In embodiments, the data payload can be transported from the host storage cloud to a data distribution service via a set of dedicated transport channels, and then can be transported from the data distribution service to the target storage cloud via an additional set of dedicated transport channels.

Otherwise, in 612, if the data stored in the one or more data distribution services is consistent with the data payload, then processing can proceed to 616 in which a transport of the data stored in the one or more data distribution services to the target storage cloud can be initiated. In aspects, the transport can be initiated in response to receiving a request or set of instructions from an administrator. In 618, the data stored in the one or more data distribution services can be transported to the target storage cloud. In aspects, the data can be transported via a set of dedicated transport channels. In 620, processing can repeat, return to a prior processing point, jump to a further processing point, or end.

The foregoing description is illustrative, and variations in configuration and implementation may occur to persons skilled in the art. For example, while embodiments have been described in which the cloud management system 104 for a particular cloud resides in a single server or platform, in embodiments the cloud management system 104 and associated logic can be distributed among multiple servers, services, or systems. Similarly, while embodiments have been described in which one group of servers within a set of resource servers 108 can provide one component to build a requested set of virtual machines, in embodiments, one group of resource servers can deliver multiple components to populate the requested set of instantiated virtual machines 116, and/or other machines, entities, services, or resources. Other resources described as singular or integrated can in embodiments be plural or distributed, and resources described as multiple or distributed can in embodiments be combined. The scope of the invention is accordingly intended to be limited only by the following claims.

What is claimed is:

1. A method comprising:
    identifying data stored in a data distribution service;
    comparing the identified data to a data payload of a host cloud provider;
    analyzing, by a processor, in view of the comparing, whether the identified data is consistent with the data payload of the host cloud provider;
    upon the analyzing that the identified data is consistent with the data payload of the host cloud provider, determining, by the processor, whether the identified data is a replica of the data payload of the host cloud provider; and
    in response to determining whether the identified data is the replica of the data payload of the host cloud provider, determining, by the processor whether to initiate a transport of the identified data to resources associated with a target cloud provider.

2. The method of claim 1 further comprising identifying the data payload in a host storage cloud of the host cloud provider, wherein identifying the data payload comprises receiving an instruction to migrate the data payload from the host storage cloud of the host cloud provider.

3. The method of claim 1, further comprising:
    initiating the transport of the identified data to the resources associated with the target cloud provider upon the determining that the identified data is replica of the data payload of the host cloud provider wherein the the identified data is transported to the resources associated with the target cloud provider via a set of dedicated transport connections.

4. The method of claim 2, further comprising:
    migrating the data payload from the host storage cloud to the target cloud provider via the data distribution service upon the determining that the identified data is not the replica of the data payload of the host cloud provider.

5. The method of claim 1, further comprising:
    comparing the identified data to an additional data payload stored on the target cloud provider when the comparison meets a threshold.

6. The method of claim 1, further comprising:
    providing a result of the comparing to an administrator associated with the data payload.

7. The method of claim 6, further comprising:
    receiving, from the administrator, a selection to transport the identified data to the target cloud provider.

8. The method of claim 1, wherein the comparing the identified data to the data payload comprises performing a checksum operation on the identified data and the data payload.

9. A system comprising:
    a processor and;
    a memory operatively coupled to the processor to:
        identify data stored in a data distribution service;
        compare the identified data to a data payload of a host cloud provider;
        analyze in view of the comparing, whether the identified data is consistent with the data payload of the host cloud provider;
        upon the analyzing that the identified data is consistent with the data payload of the host cloud provider, determine whether the identified data is a replica of the data payload of the host cloud provider; and
        in response to determining whether the identified data is the replica of the data payload of the host cloud provider, determine, whether to initiate a transport of the identified data to resources associated with a target cloud provider.

10. The system of claim 9, the processor to identify the data payload in a host storage cloud of the host cloud provider, wherein the identify the data payload comprises receive an instruction to migrate the data payload from the host storage cloud of the host cloud provider.

11. The system of claim 9, the processor to:
    initiate the transport of the identified data to resources associated with the target cloud provider upon the determining that the identified data is replica of the data payload of the host cloud provider wherein the the identified data is transported to the resources associated with the target cloud provider via a set of dedicated transport connections.

12. The system of claim 9, the processor to:
    migrate the data payload from the host storage cloud to the target cloud provider via the data distribution service upon the determining that the identified data is not the replica of the data payload of the host cloud provider.

13. The system of claim 9, the processor to:
    compare the identified data to an additional data payload stored on the target cloud provider when the comparison meets a threshold.

14. The system of claim 9, the processor to:
    provide a result of the compare to an administrator associated with the data payload.

15. The system of claim 14, the processor to:
    receive, from the administrator, a selection to transport the identified data to the target cloud provider.

16. The system of claim 9, wherein the compare the identified data to the data payload comprises perform a checksum operation on the identified data and the data payload.

17. The method of claim 1 further comprising:
    replicating the data payload of the host cloud provider; and
    storing the replicated data payload in the data distribution service.

18. The system of claim 9, the processor to:
    replicate the data payload of the host cloud provider; and
    store the replicated data payload in the data distribution service.

* * * * *